United States Patent [19]

Bezaire et al.

[11] Patent Number: 5,758,088
[45] Date of Patent: May 26, 1998

[54] SYSTEM FOR TRANSMITTING MESSAGES, BETWEEN AN INSTALLED NETWORK AND WIRELESS DEVICE

[75] Inventors: David L. Bezaire, Hilliard; Stephen J. H. Owens, Dublin; Daniel J. Hronek, Columbus, all of Ohio

[73] Assignee: CompuServe Incorporated, Columbus, Ohio

[21] Appl. No.: 900,033

[22] Filed: Jul. 24, 1997

Related U.S. Application Data

[63] Continuation of Ser. No. 780,216, Jan. 8, 1997, abandoned, which is a continuation of Ser. No. 436,935, May 8, 1995, abandoned.

[51] Int. Cl.$^6$ .................................................. G06F 13/00
[52] U.S. Cl. ................................................. 395/200.62
[58] Field of Search ................... 364/DIG. 12, DIG. 25; 340/825.07; 370/254, 259, 277, 310, 313, 351; 395/200.3, 200.34, 200.35, 200.36, 200.37, 200.47, 200.49, 200.5, 200.57, 200.62, 200.68, 200.74

[56] References Cited

U.S. PATENT DOCUMENTS

| Re. 32,365 | 3/1987 | Sebestyen | 340/311.1 |
|---|---|---|---|
| 4,951,044 | 8/1990 | Nelson et al. | 340/825.44 |
| 5,315,642 | 5/1994 | Fernandez | 379/96 |
| 5,329,578 | 7/1994 | Brennan et al. | 379/67 |
| 5,353,331 | 10/1994 | Emery et al. | 379/58 |
| 5,410,543 | 4/1995 | Seitz et al. | 370/85.13 |

*Primary Examiner*—Robert B. Harrell
*Attorney, Agent, or Firm*—Standley & Gilcrest

[57] ABSTRACT

A system is disclosed in which electronic communications such as e-mail messages may be sent to a wireless device. The electronic communications originate or are transmitted through an information service that sends the communications to a wireless service provider capable of communicating with different types of wireless devices. Recipients of electronic communications register their wireless devices with the information service and may take advantage of the sophisticated messaging features of the information service to determine what information should be sent to the wireless device.

13 Claims, 29 Drawing Sheets

| Element | Attributes |
|---|---|
| Device type | integer:<br>0 = numeric<br>1 = alpha one-way<br>2 = alpha two-way<br>3 = PCPAGER one-way<br>4 = PCPAGER two-way |
| User ID | 13 characters of form 000000.000000 |
| Last Name | 15 alphanumeric characters |
| First Name | 15 alphanumeric characters |
| Major Carrier | 20 alphanumeric characters (from list or entered) |
| Coverage City Name | 0 - 20 alphanumeric characters |
| Coverage State code | 0 - 2 alphanumeric characters |
| Coverage Country code | 2 alphanumeric characters |
| PIN | 15 alphanumeric characters |
| Frequency | Integer, in Hertz (1-999,999,999) |
| Phone Number (DID or modem access) | max 12 numeric characters (country, area code and number) |
| Registration date & time | universal time |
| Last Modification | universal time |
| Validation number | integer (1110000 - 111999) |
| Validation number | integer (1110000 - 111999) |
| UADD Message ID | alphanumeric (up to 60 characters) |
| Registration Failure code | integer, 1 - 999 (TBD) |
| Registration Failure text | up to 60 alphanumeric characters |

Fig. 4A

| Element | Attributes |
|---|---|
| Registration State | integer<br>0 = device entry purged<br>1 = user add requested, message ack pending<br>2 = user add requested, message ack timeout<br>3 = waiting for UACK/UNACK<br>4 = user add/modify registration nack'd<br>5 = user add/modify ack timeout<br>6 = user add/modify registration ack'd: validation pending<br>7 = user cancel/delete requested<br>8 = user cancel/delete ack'd<br>9 = user cancel/delete ack timeout<br>10 = user cancel/delete nack<br>11 = user registration validated, VACK pending<br>12 = validation ack'd (registration complete) |
| Message Sequence Index | integer ( 1 - 99) |
| Max characters / Page (entered by user at registration, negotiated in UACK; profile warning limit) | integer, 1 - 99,999 |

Fig. 4B-1

| | |
|---|---|
| Max characters / Page (adjusted by user in via profile menu: actual "splitting" limit) | integer, 1 - 99,999 |
| Max pages per day | integer, 1 - 99,999 |
| Max pages per month | integer, 1 - 99,999 |
| Max pages per e-mail message | integer, 1 - 99 |
| List in CompuServe directory | boolean flag |
| Accept non-rules based messages | boolean flag |
| Block Postage Due | boolean flag |
| Block Gateway Messages | boolean flag |
| Common Name Sender preferred | boolean flag |
| Truncate Sender | integer, 0 - 999 characters (0 - none) |
| Truncate Subject | integer, 0 - 999 characters (0 - none) |

Fig. 4B-2

| Generated by CompuServe | Generated by Wireless Service Provider |
|---|---|
| User Add Request (UADD) - sent when a user attempts to register a new wireless device (or modify an old registration request) on the CompuServe service. | Message Acknowledgment (MACK) - sent in immediate response to a User Add Request, indicates that the request has been received and will be processed within the next 24 hours. |
| | User Add Request Positive Ack (UACK) - sent in response to a User Add Request (UADD), once a users test page has been successfully transmitted by the wireless service provider, and the user has been added to the wireless service providers registry. |
| | User Add Request Negative Ack (UNAK) - sent in response to a User Add Request (UADD), when a problem is encountered by the wireless service provider at any time during verification of the users information, transmission of the test page or addition of the user to the wireless service providers CompuServe user list. |

Fig. 5A

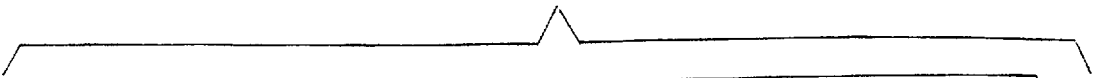

| User Cancel/Delete (UDEL) - sent when a user cancels a registration in process or deletes a currently registered device. | User Cancel/Delete Positive Ack (UDACK) - sent in response to a User Delete Request (UDEL) once a user has been successfully deleted from the wireless service providers CompuServe user list. |
|---|---|
| | User Cancel/Delete Negative Ack (UDNAK) - sent in response to a User Delete Request (UDEL) if there is a problem deleting a user from the wireless service providers CompuServe user list. |
| User Validation (UVAL) - sent when a user enters correct validation number, informing provider that it may tally the successful registration. | User Validation Acknowledge (UVACK) - Wireless service provider acknowledgment of the UVAL. |

Fig. 5B

Registration Related Fields

*Registration Message Ack Field (MACK)*

1. W-MACK-message-id:<message id)

- Required

- Contains id of this message, max 60 characters

2. W-MACK-original-message-id:<message id)>

- Required

- Contains message id of original message, echoed back; max of 60 characters

3. W-MACK-User:<User-id>

- Required

- CompuServe ID from MACK echoed back

4. W-MACK -Device-Type: <type>

- Required

- type from MACK echoed back

*Fig. 8A-1*

User Add Request (UADD)

1. W-UADD-Message-id:<message id>

- Required

- character max

2. W-UADD-User: <User-id>

- Required

- CompuServe User ID - octal digits: nnnnnn.nnnnn

3. W-UADD-Device-type:<type>

- Required

- type of device from supported list:
        - "NUMERIC"
        - "ALPHA1"
        - "ALPHA2"
        - "PCPAGER1"
        - "PCPAGER2"

4. W-UADD-Name: <First>.<last>

- Required

- First- first name (20 alphanumeric characters)

Fig. 8A-2

- Last- last name (20 alphanumeric characters)

5. W-UADD-Carrier:<Carrier-id>

- Required

- major carrier/reseller name OR customer entered name

- 20 characters alphanumeric

User Add Request (UADD), cont'd

6. W-UADD-PIN: <PIN>

- Required for alphanumeric, optional for numeric devices

- 15 character max PIN

7. W-UADD-Phone: <phone#>

- required (DID) for numeric, optional DID or modem access for alphanumeric

- up to 12 numeric digit (country code, applicable area code and number)

8. W-UADD-Frequency: <Frequency>

- Required for alphanumeric only

- numeric frequency in megahertz (MMM.KKKK format)

9. W-UADD-Coverage: <City>.<state>.<country>

- Required for alphanumeric

- 20 character city (blank for national)

- 2 character state code (blank for national)

Fig. 8B-1

- 2 character country code

10. W-UADD-Validation:<number>

- Required

- number: seven digit integer validation number.

11. W-UADD-Profile:<TBD>

- Optional

- TBD profile info for two-way devices

12. W-UADD-User-Phone:<userPhoneNumber>:<TBD>

- Optional

- Info required to register a phone, TBD.

Fig. 8B-2

User Add Request Acks (UACK,UNAK)

1. W-UACK-Message-ID:<Message-ID>

- required

- 60 character max

2. W-UACK-Original-Message-ID:<message-id>

- required

- original message ID echoed back

3. W-UACK-User: <User-id>.

- Required

- CompuServe ID from UADD echoed back

4. W-UACK-Device-Type: <type>

- Required

- type from UADD echoed back

5. W-UACK-Max-Chars:<maximum>

- Required

- integer max characters received by RCC, 1-99,999

Fig. 8C-1

6. W-UNAK-code:<diagnostic code>

- Required for UNAK's only

- diagnostic codes to be defined

7. W-UNAK-message:<diagnostic text>

- Required

- Max of 60 characters describing problem

User Validated (UVAL)

1. W-UVAL-Message-ID:<Message-ID>

- required, 60 character max

2. W-UVAL-User: <User-id>

- Required

- CompuServe ID

3. W-UVAL-Device-Type: <type>

- Required

- type (see UADD)

*Fig. 8C-2*

4. W-UVAL-MaxSize: <max>

- Required

- max: number of characters per page, 1-99,999

- initial release: this should be restricted to 1024

User Validation Acknowledgment (UVACK)

1. W-UVACK-Message-ID:<Message-ID>

- required, 60 character max

2. W-UVACK-Original-Message-ID:<message-id>

- required

- original message ID echoed back

3. W-UVACK-User: <User-id>

- Required

- CompuServe ID from UVAL echoed back

4. W-UVACK-Device-Type: <type>

- Required

- type from UVAL echoed back

User Delete Request (UDEL)

1. W-UDEL-Message-ID:<Message-ID>

- required, 60 character max

2. W-UDEL-User: <User-id>

Fig. 8D-1

- Required

- CompuServe ID

3. W-UDEL-Device-Type: <type>

- Required

- device type (see UADD)

Fig. 8D-2

User Delete Request Acks (UDACK,UDNAK)

1. W-UDACK-Message-ID:<Message-ID>

- required, 60 character max

2. W-UDACK-Original-Message-ID:<message-id>

- required

- original message ID echoed back

3. W-UDACK-User: <User-id>

- Required

- CompuServe ID from UDEL echoed back

4. W-UDACK-Device-Type: <type>

- Required

- type from UDEL echoed back

5. W-UDNAK-code:<diagnostic code>

- Required for UDNAK's only

- diagnostic codes to be defined

6. W-UDNAK-message:<diagnostic text>

*Fig. 8E-1*

Message Related Fields

Message (MSG)

1. W-MSG-Message-id:<message id>

- Required

- 60 character max

2. W-MSG-User: <userid>

- optional

- CompuServe User Id

3. W-MSG-CustID

- RESERVED HEADER

4. W-MSG-Oneoff

- Optional

- indicates message is not for a registered user and that address should reflect oneoff formats 5. W-MSG-device-type: <type>

- Optional

- type (see list under UADD)

6. W-MSG-DID: <phone number>

- Optional, option for one-off messages

- phone number for numeric device (area code and number, no 0 or 1 prefix)

7. W-MSG-PIN: <PIN>

- Optional, for oneoff messages

- up to 15 alphanumeric characters

8. W-MSG-RCC-ID: <RCC-ID>

- Optional, for use with one-off alphanumeric devices

- RCC-ID: 15 character RCC id from list

9. W-MSG-originator.<address>

- Required

- address: originating CompuServe address string

Fig. 8F-2

10. W-MSG-Report-Request:<user-request>[.audit]

- Optional, presence indicates delivery report requested

- Absence indicates no report requested

- user request - "none", "negative", or "positive"

- the "audit" modifier is optional and indicates that a report (negative or positive) is always to be generated regardless of the user request.

Fig. 8F-3

DISPLAY FORMAT (to recipient wireless device)

1. Numeric Devices

- Registered Devices

- If message subject is not a numeric string then message is rejected with negative delivery report. Otherwise the subject is used as the text to be displayed and is installed in the body of the message.

- If the message length exceeds 20 then it is truncated by the CompuServe gateway.

- Unregistered Devices (Free form)

- Same as registered devices

2. Alphanumeric Devices

- Registered Devices

- Message body is formatted as:
          CIS<n>/<originator>/<size>/<subject>/<body>

Fig. 9A

- Where "n" indicates the number of the message index or sequence number for the device for the day. This is of the form xx (1 to 99) for a single part message, or xx.yy for a multi-part message (1.1 for the first part of the first message, 1.2 for the second part of the same message, etc.) ...

- Originator will be limited in size (per the user's profile). If the preferred originator is the "common name" AND the originating address contains a non-null common name field then the common name will be used in lieu of the actual address. The common name is subject to the same truncation limit.

- The subject field will be truncated to the length defined by the user.

- Size will be the size of the original message, in the form n, nK or nM where "n" is a number and K = kilobytes, M = megabytes...

- Body of message text will contain message, or part of a message, if multi-part.

Fig. 9B

- If message length violates defined limit then it is broken up into multi-part messages and/or truncated depending on the limit the user specified. Only the first part of a multipart message will contain the originator/size/subject items.

• Unregistered Devices (free Form)

- Sequence ID prefix is not included

- Originator address is always used (vs common name).

- Originator address and subject are not subject to truncation

- No message splitting or truncation is performed by CompuServe.

Fig. 9C

SYSTEM FOR TRANSMITTING MESSAGES, BETWEEN AN INSTALLED NETWORK AND WIRELESS DEVICE

This application is a file wrapper continuation of application Ser. No. 08/780,216 filed Jan. 8, 1997 now abandoned which is a continuation of Ser. No. 08/436,935 filed May 8, 1995, now abandoned.

BACKGROUND OF THE INVENTION

1. Field of the Invention

The present invention relates generally to a system for electronic messaging via wireless devices, and particularly, a system for communicating select information to wireless devices by use of an electronic mail gateway to a wireless network service provider.

2. Description of the Related Art

Electronic mail, or e-mail, provides a convenient and easy means for two or more individuals to communicate electronically. Users who rely on e-mail and other electronic messages for business and personal communications have a need for organizing and managing the information they send and receive. On-line information services, such as CompuServe®, provide the services individuals need to locate, send, receive, and manage information that is of interest to their users. For example, features in the CompuServe Mail facility include the ability to compose and send messages easily, the ability to forward messages to other users, and the ability to establish a set of rules for accepting incoming messages. In addition, users may send and receive important business and financial information in the form of e-mail messages.

Wireless and mobile communication and computing devices facilitate communications that may take place almost anywhere and at almost anytime. The proliferation of different devices and associated technologies has lead to the development of wireless service gateways that provide a common communication channel to dissimilar wireless and mobile devices. These gateways are developed and maintained by wireless service providers who ensure that incoming messages from a variety of sources are sent to the proper device. Among the capabilities provided by the wireless service provider is the ability to send electronic messages to its subscribers. These messages may vary in content from simple numeric messages to lengthy alphanumeric messages. In most instances, however, the wireless service provider supplies only transport services so that messages are passed through as they are received. Recipients do not have the ability to control what information is received at the wireless device. The ability to filter incoming information and messages may be very limited.

SUMMARY OF THE INVENTION

The use of e-mail and wireless communication devices has become so pervasive that increasingly, users want to be able to send and receive electronic messages on their wireless communication devices. Ideally, senders should be able to compose messages using the facilities with which they are familiar. Furthermore, if senders want to reach recipients at their wireless devices, senders should not be required to know details about the device in order to send information to it. Recipients, on the other hand, should be able to determine what messages they will accept on their wireless devices. The present invention allows a wireless device user to receive select information—via a wireless service provider—at the wireless device.

To use the present invention, a wireless device user registers the device with an information service. The registration process is self-administering—meaning the wireless device user registers the device through an interactive, online session with the information service—so that no human intervention is required. This self-registration process is more convenient and efficient for users and more cost effective than a registration process requiring assistance from a customer service representative. Users are not required to purchase a special device nor are they limited to registering one of only a few devices with which the information service can communicate. Users may register their existing wireless devices or any of a number of devices from many different manufacturers. The ability to communicate with many different devices results in greater efficiencies and cost savings for wireless device users.

Through the registration process, the device is associated with the user's information service ID. Messages are then addressed to the user's ID so that the sender need not know identification information about the device in order to send a message. Because messages are sent through the information service, the recipient may take advantage of the sophisticated messaging capabilities that the information service provides—for example, the ability to selectively accept incoming messages. Messages destined for wireless devices are then routed to wireless service provider responsible for routing the message to the correct device. The advantages of the present invention are explained further by the accompanying drawings and detailed description.

BRIEF DESCRIPTION OF THE DRAWINGS

FIGS. 4A and 4B are diagrammatic representations of the device information for a preferred embodiment of the present invention;

FIGS. 5 is a chart of the events passed into and out of the wireless message gateway;

FIGS. 8A, 8B, 8C, 8D, 8E and 8F illustrate a message body for a preferred embodiment of the present invention; and FIG. 9 illustrates the format of display information for a preferred embodiment of the present invention.

DETAILED DESCRIPTION OF PREFERRED EMBODIMENT(S)

Figure 1:
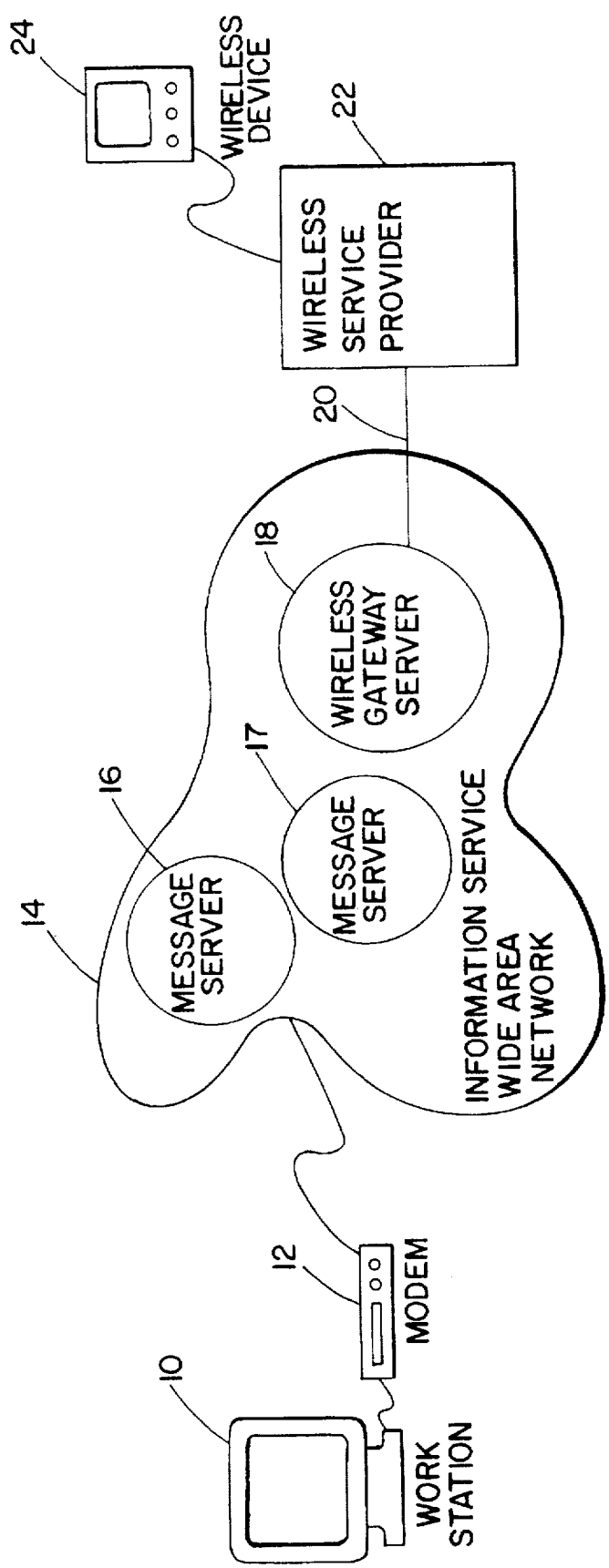
FIG. 1 is a diagrammatic view of one embodiment of the present invention.

The present invention defines an interface whereby an information service may send messages through a wireless service provider to wireless devices. Referring now to FIG. 1, there is shown a preferred embodiment of the system of the present invention. A message destined for a wireless device 24 may originate at a workstation 10 connected via a modem 12 to an information service wide area network 14. Messages may originate from other devices and those devices may connect to the information service wide area network through other means such as X.25 communication links.

Messages destined for a wireless device pass through one or more information service message servers 16, 17 before arriving at the wireless gateway server 18. In some instances, the servers through which the messages pass perform one or more operations on the messages before sending them to the next server. Additionally, one server may call on another server to provide information necessary to complete an operation. For example, one server may responsible for applying information filtering rules to the message to determine what message action should be performed next. Preferably, the wireless gateway server 18 locates the registered wireless device information and formats the message so that the wireless service provider may send the message to the proper device. Preferably, the wireless gateway server performs any address translation that may be required for routing the information service message to the correct wireless service provider.

The wireless gateway server 18 is connected to the wireless service provider 22, preferably, via a dedicated communication link 20 so that messages are delivered in a timely manner. Although any of a number of protocols may be used for routing messages, preferably, TCPIP/SMTP is used as network, transport, and messaging application protocols so that the Internet addressing scheme may be used to communicate with the wireless service provider.

Figure 2:
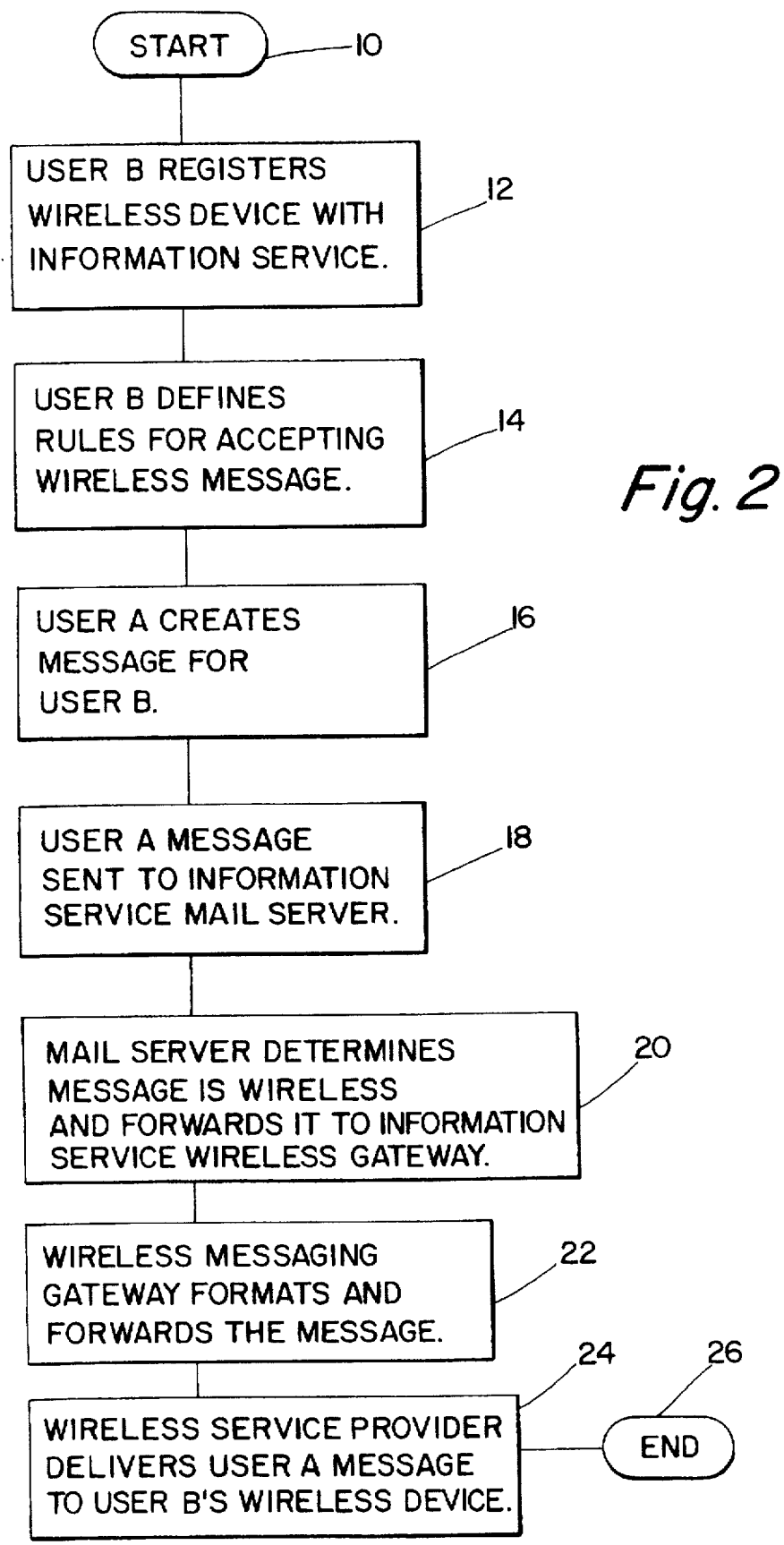
FIG. 2 is a flow chart of the principal steps for sending a message from one user to another.

Referring now to FIG. 2, there is shown the principal steps for sending a message between two users—User A and User B. User A, the message originator, may be, but is not necessarily, a subscriber to the information service. User B is an information service subscriber who would like to receive incoming messages on a wireless device. The process begins, preferably, with User B registering the wireless device with the information service 12. During registration, User B provides information needed by the wireless service provider to determine how to "reach" the device. Preferably, User B provides this information through an interactive, online session with the information service. Alternatively, User B may call a customer service representative to provide the information. In either case, User B has the option of registering one or more wireless devices from a variety of manufacturers. Preferably, User B is not limited to one of a few wireless devices supported by the information service.

In the next step 14, which is optional, User B may define specific rules for accepting messages on the wireless device. For example, User B may choose to accept all incoming messages or to accept messages from only certain originators. The options described here are exemplary only. Other options may be provided without departing from the scope and spirit of the present invention. Furthermore, this step could be performed at any point before or after the device has been registered.

In the next step 16, User A creates a message to send to User B. Preferably, for the message address, User A provides User B's information service ID and an indicator that the message should be forwarded to User B's wireless device. The indicator may be a word such as "MOBILE." Preferably, the actual wireless device address is constructed from information obtained from a look-up based on the information service ID. For this type of addressing—indirect addressing—the sender does not know or need to know the recipient's device information. Preferably, the actual format of the message is:

MOBILE:<user id>.<type>

The types of wireless devices may include, among others, numeric pagers (designated "numeric"), one-way alphanumeric pagers (designated "alpha1"), two-way alphanumeric pagers (designated "alpha2"), and one-way (designated "PCPAGER1") and two-way (designated "PCPAGER2") PCMCIA pager devices.

For free-form or "one-off" wireless devices, the sender may address the wireless device directly provided he or she knows the recipient device identification details. The address format is preferably:

MOBILE:<RCC_ID>.<PIN>.<type> for alphanumeric devices where RCC_ID is the radio common carrier identifer and the PIN is a personal identification number; and MOBILE:<phone>.<optional.PIN>.<type> for numeric devices.

User A's message, which contains an information service address, is next sent to the information service mail server 18. Preferably, the mail server examines the message to determine that its destination is a wireless device 20. The mail server may perform other functions, call on other servers to provide information necessary to complete an operation, or send the message to another server for additional processing. Preferably, if User B has defined any rules for incoming messages, they are applied to User A's message at this point. If User A's message meets User B's selection criteria, then the message is routed to the information service wireless messaging gateway for further processing 22. Preferably, the gateway locates the wireless device information associated with User B's ID and formats the message appropriately so it may be forwarded by the wireless service provider to the proper device. The gateway then forwards the messages to the wireless service provider. The wireless service provider uses the device information to locate specific details needed to forward the message to the correct device 24.

In other embodiments of the present invention, a wireless device user may arrange to have sports, business, financial, and other types of information available from the information service sent directly to the device. The message therefore, originates from the information service itself rather than another information service subscriber or another non-subscriber. Although the originator of the message is different, the techniques of the present invention may be used to send this information to the wireless device.

Figure 3:
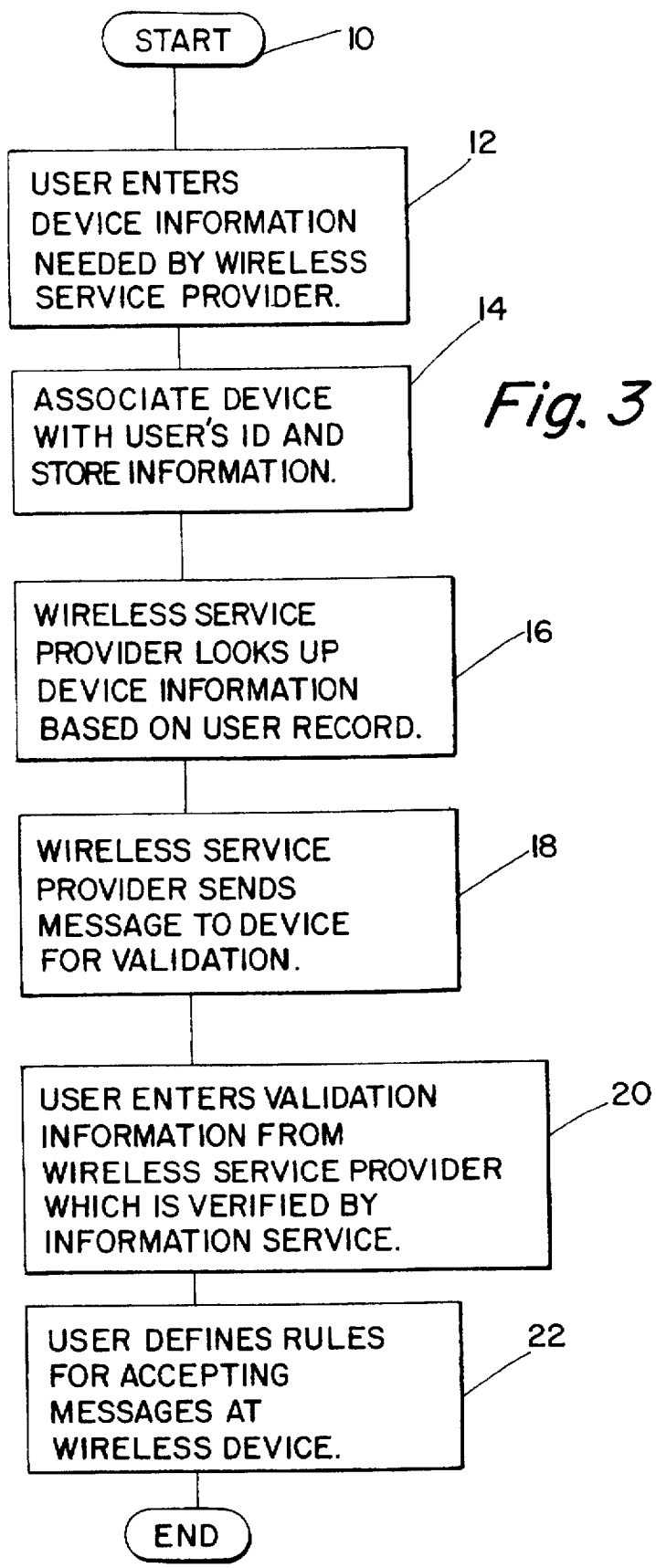
FIG. 3 is a flow chart of the principal steps for registering a device with an information service.

Referring now to FIG. 3, the steps of registering a device with the information service are shown. The process begins, preferably, with the user entering information needed by the wireless service provider to determine how to "reach" the device 12. The information may include the carrier or reseller name, a personal identification number, the coverage location where messages may be received on the device, the frequency of the device, the phone number, and the maximum size message received by the device. Preferably, this information is associated with the user's ID so that it may be retrieved when messages are directed to the ID.

In the next step 16, the wireless service provider locates information needed to send a message to the wireless device. In step 18, the wireless service provider sends a text message to the wireless device containing a validation number and a visual indicator of the maximum number of characters the device can receive. The message is in the format defined by the information service. Preferably, the wireless service provider detects transmission failure related to the size of the test message and retries with a legal message size. The user validates the test message by entering and sending to the information service both the unique validation number and the number of characters actually received on the test page 20. The information service then verifies the validation information thus closing the feedback loop 20. Finally, the user may optionally define rules for accepting incoming messages 22.

Referring now to FIGS. 4A and 4B, there is shown a diagrammatic representation of device for a preferred embodiment of the present invention. A listing of the preferred device registration information is shown.

The information service wireless messaging gateway and wireless service provider communicate via messages representing events that may occur while the system is operating. FIG. 5 lists the events passed into and out of the wireless messaging gateway when a device is registered. The events generated by the information service wireless messaging gateway include user add, cancel/delete, and validation 10, 12, 14. The events generated by the wireless service provider are acknowledgments sent in response to the events generated by the information service 16, 18, 20, 22, 24, 26.

Figure 6A:
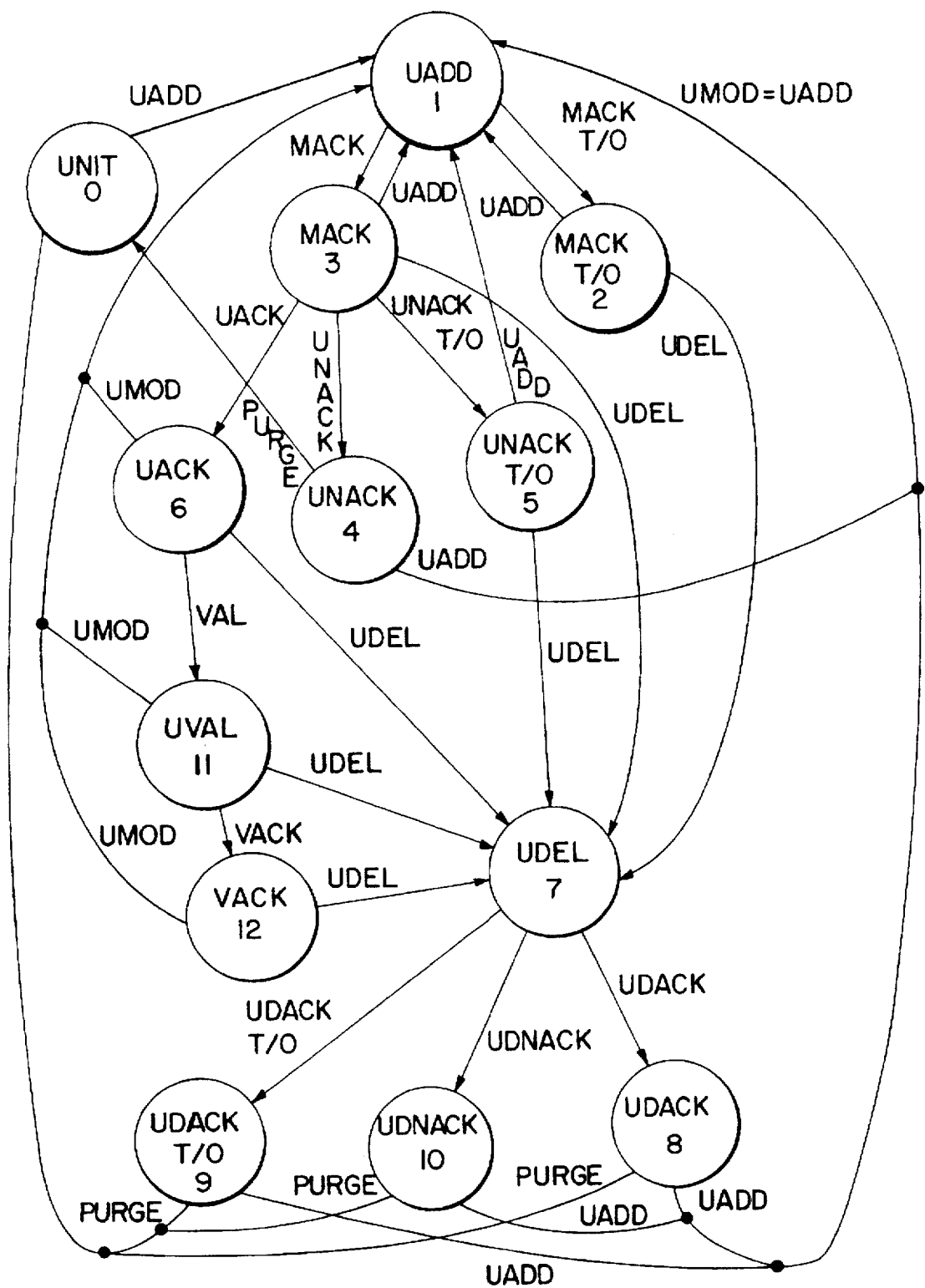
FIGS. 6A and 6B are state transition diagrams for a preferred embodiment of the present invention.
Figure 6B:
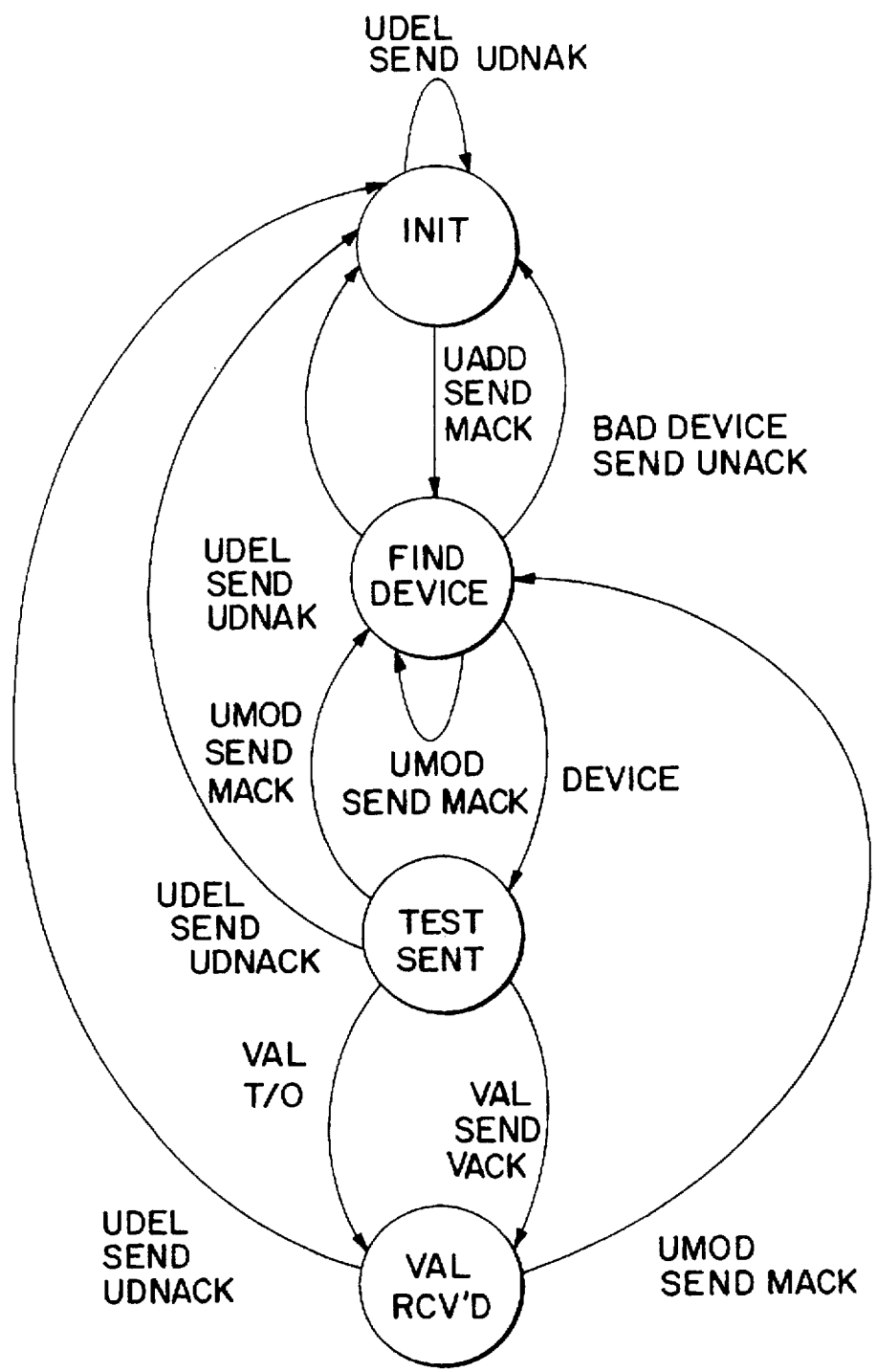

FIGS. 6A and 6B are state transition diagrams for a preferred embodiment of the present invention. The state transition diagrams represent the various states the system enters in response to particular events that may occur when a wireless device is registered. FIG. 6A shows the states from the perspective of the wireless messaging gateway. FIG. 5B shows the states from the perspective of the wireless service provider.

Figure 7:
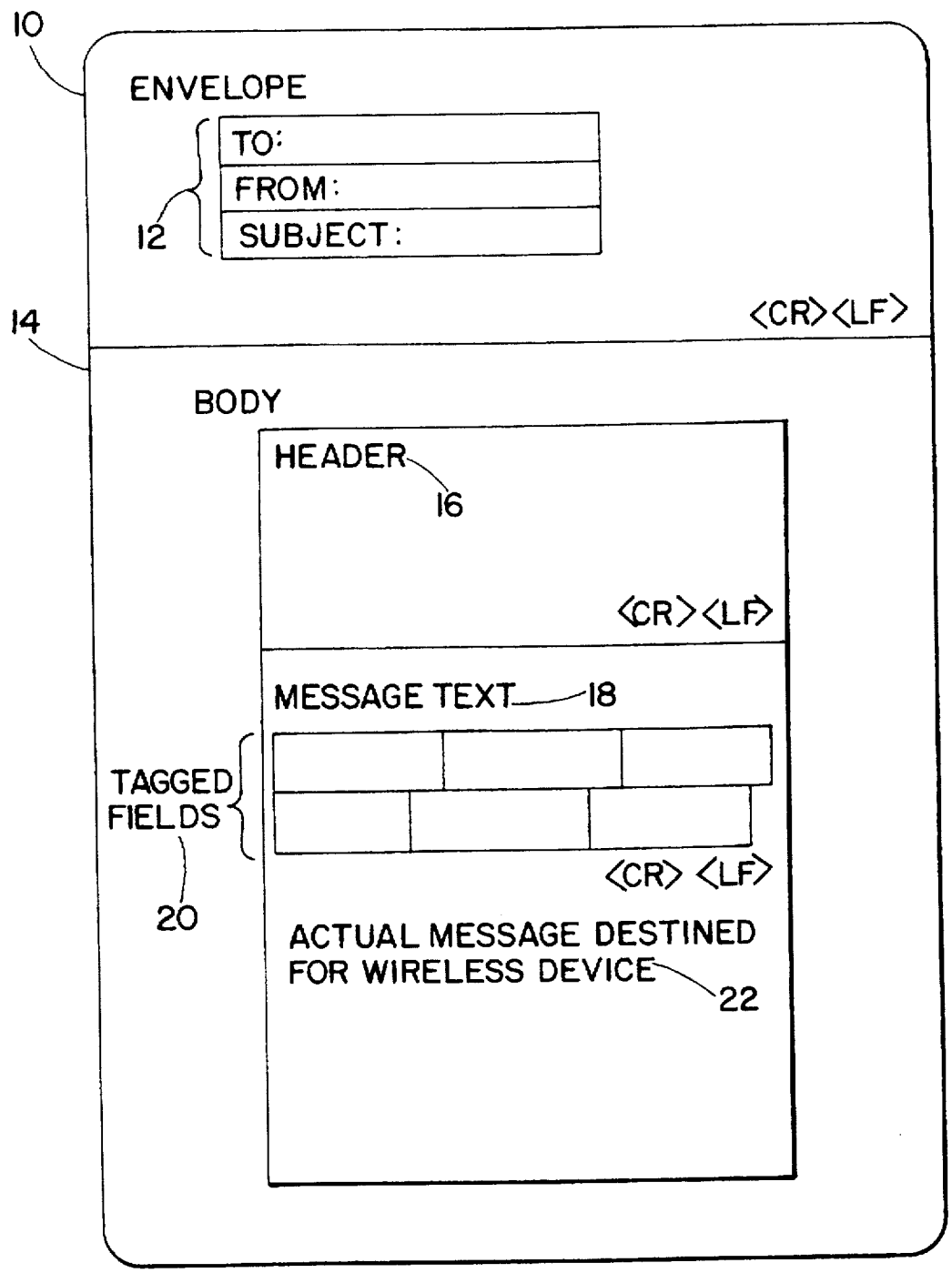
FIG. 7 is a diagrammatic representation of an event message.
Figures 3, 8A:
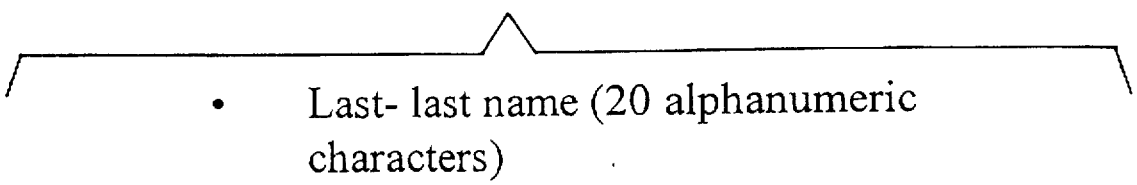
Figures 3, 8C:
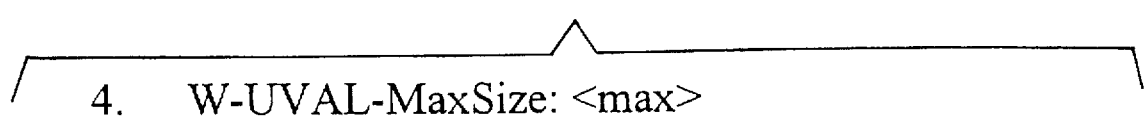
Figures 2, 8E:
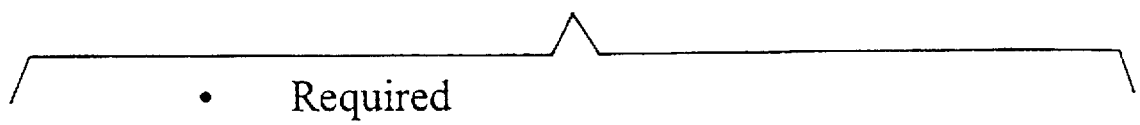
Figures 1, 8F:
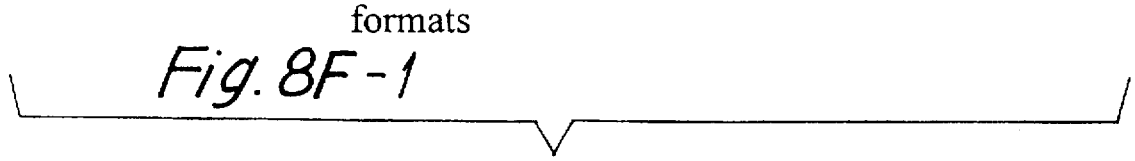

FIG. 7 illustrates the mechanism by which events defined in FIG. 3 are communicated to the wireless service provider. Events are communicated to the wireless service provider via well-defined fields within the text body part of messages. The actual format of a message may vary depending on the message type. As shown in FIG. 7, messages are composed of an envelope 10 and a body 14. An envelope 10 may contain information such as the name and address of the recipient, the name and address of the originator, and a subject heading. The actual contents of the envelope may vary depending on the message type. The envelope is delimited with a carriage return and line feed. The body 14 is composed of a header 16 and message text (or text "body part") 18. Event information is provided as tagged fields 20 in the beginning of the message text. The number and format of the tagged fields vary depending on the message type. Messages destined for wireless devices have tagged field containing an indicator for the wireless application.

FIGS. 8A through 8K illustrate the tagged field types and formats for a preferred embodiment of the present invention. The tagged fields are used by the wireless service provider to forward messages to the correct device.

The actual text of the message destined for the wireless device 22 is delimited from the tagged field information by a carriage return, line feed blank line. The format of the message body varies depending on the destination device type. FIG. 9 illustrates the format of one particular message type for a preferred embodiment of the present invention.

The present invention allows users of wireless devices to receive important personal and business messages at their wireless devices. Because messages are delivered via an information service, both message originators and recipients may take advantage of sophisticated messaging creation and management features available on the information service. Originators may send messages without particular knowledge about the type of wireless device used by the recipient nor any special information about addressing the wireless device. Recipients benefit from the approach of the present invention for several reasons. First, wireless device users may take advantage of a self-registration process for registering their devices. Second, recipients may access the online information service to get messages that may not have been delivered to the wireless device. In addition, recipients may use the sophisticated message filtering features of the online information service to control what information is sent to the wireless device. The ability to apply sophisticated filtering operations on messages destined for a wireless device is unique to the present invention. Finally, recipients may register more than one wireless device or make arrangements to use different devices without a need for the originator to know what, if any changes, have been made.

What is claimed is:

1. A communication system comprising:

a wireless device capable of receiving electronic communications;

a computer network with devices capable of receiving, generating, and transmitting electronic communications;

wireless device information required for communicating with said wireless device, said wireless device information provided by a user of said wireless device through registration of said wireless device with said computer network;

filtering rules for selectively transmitting said electronic communications to said wireless device, said rules defined by said user of said wireless device; and a connection between said computer network and said wireless device for transmitting from said computer network to said wireless device said filtered electronic communications using said wireless device information.

2. The system of claim 1, wherein said connection between said computer network and said wireless device is through a wireless device service provider.

3. The system of claim 2, wherein said connection between said wireless device and said computer network through a wireless device service provider is a dedicated communication link.

4. The system of claim 1, wherein said user of said wireless device registers said wireless device with said computer network through a online, interactive session with said computer network devices.

5. The system of claim 4, wherein wireless device information provided by said user during said registration is associated with a user identifier so that messages to said user's wireless device may be sent using said identifier.

6. The system of claim 1, wherein said computer network is an information service network capable of accepting information feeds directly or indirectly from a variety business, financial, sports, and other information sources and capable of sending electronic communications containing information from said feeds.

7. The system of claim 1, wherein said electronic communications include electronic mail messages from individuals.

8. The system of claim 1, wherein said wireless device is capable of generating and transmitting electronic communications to said computer network.

9. The system of claim 1, wherein said wireless device is a pager.

10. A method of communication between an information service and a wireless device, said method comprising the steps of:

registering a wireless device with an information service by providing wireless device registration information;

receiving at said information service electronic communications;

filtering said electronic communications for transmission to said wireless device;

transmitting, using said wireless device information, said filtered electronic communications from said information service to said wireless device; and storing said device registration information for later retrieval.

11. The method of claim 10, further comprising the step of associating said device registration with an information service identifier.

12. The method of claim 10, wherein said electronic communications from said information service to said wireless device are transmitted through a wireless device service provider.

13. An electronic communication system comprising:

a pager capable of receiving electronic mail messages;

a wireless service provider capable of transmitting electronic mail messages to said wireless device;

an information service capable of generating, receiving, filtering, and transmitting electronic mail messages;

an interactive, online session for registering information about said pager with said information service; and a dedicated connection between said information service and said wireless service provider for transmitting filtered electronic mail messages to said pager using said registered information.

* * * * *